R. C. HELMAN.
CHUCK.
APPLICATION FILED NOV. 20, 1907.

933,071.

Patented Sept. 7, 1909.

WITNESSES:
C. W. Carroll
L. Thow.

INVENTOR
Ray C. Helman
by Osgood Davis
his attorneys

UNITED STATES PATENT OFFICE.

RAY C. HELMAN, OF ELMIRA, NEW YORK, ASSIGNOR TO ECLIPSE MACHINE COMPANY, OF ELMIRA, NEW YORK, A CORPORATION OF NEW YORK.

CHUCK.

933,071.   Specification of Letters Patent.   Patented Sept. 7, 1909.

Application filed November 20, 1907. Serial No. 403,066.

*To all whom it may concern:*

Be it known that I, RAY C. HELMAN, a citizen of the United States, and resident of Elmira, in the county of Chemung and State of New York, have invented certain new and useful Improvements in Chucks, of which the following is a specification.

This invention relates to improvements in chucks, and has for its object to provide a simple and easily operated device of few parts.

Figure 1:
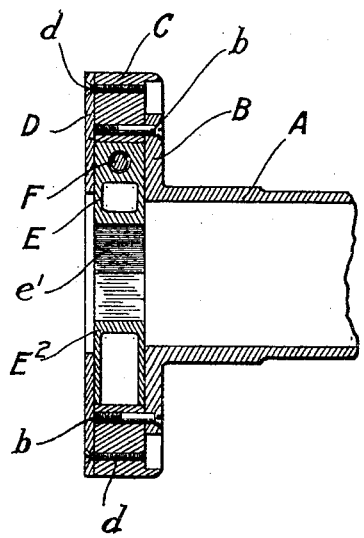
Figure 2:
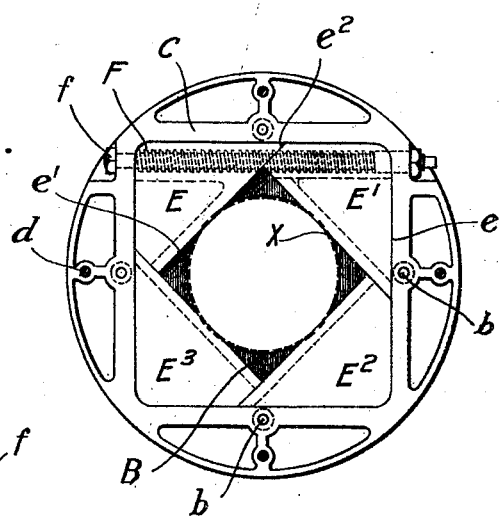
Figure 3:
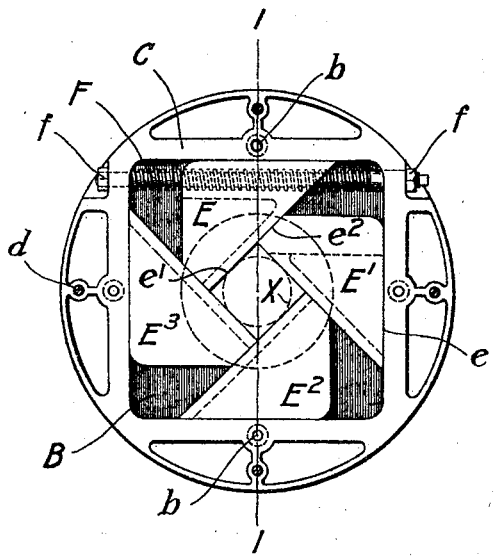

In the drawings:—Figure 1 is a vertical section of the chuck on the line 1—1 of Fig. 3; Fig. 2 is a front elevation, showing the parts in one position; and Fig. 3 is a front elevation, showing the parts in other positions, the outside plate being removed.

A represents the barrel of the chuck, which has a flange B. The frame for the clamping jaws comprises the flange B, the ring C, secured thereto by bolts or screws $b$, and the face plate D, which is in turn fastened to the ring C by bolts or screws $d$, all of which are clearly shown in Fig. 1. The clamping jaws, four in number, are triangular in shape, and the frame made by the conjunction of the three parts A, B, and C, forms an open rectangle, with flanges along its edges on each face, that is adapted to contain said jaws, and permits them to slide with reference to each other. Each of the triangular jaws E, E', $E^2$ and $E^3$ slides on one of its edges $e$ in the frame, and the work X is clamped between their edges $e'$, as shown in Figs. 2 and 3. The jaws are actuated by the screw F, which is held revolubly within the frame, as by the nuts $f$, and which acts upon one of the jaws E, as shown in the drawings. As the block E is moved in one direction, toward the right in the figures, its edge $e'$ approaches the center of the frame. In order that this movement of the block E may cause a similar movement on the part of the blocks E', $E^2$ and $E^3$, each block is cut away at the angle adjacent to the adjoining block, so that the edge $e^2$, thus formed, contacts with the clamping edge $e'$ of the adjoining block. The edge $e'$ of each block is recessed, as shown by dotted lines in Fig. 3, to receive the edge $e^2$ of the adjoining block, and the block E' is likewise recessed, as is also shown by dotted lines in the drawing, to accommodate the actuating screw F when the jaws are wide open, as shown in Fig. 2. It is apparent from this description that when the screw F is turned by a wrench, or other suitable means, in one direction, the block E is moved toward the right, and that that in turn causes the other blocks to move up toward the center, whereas, by turning the screw in the opposite direction, the block E recedes from the center and permits the other blocks to slide back.

What I claim is:—

A machine chuck consisting of a barrel provided with a circular flange at one end, a ring secured to the face of the flange and having a square opening, a face plate secured to the outer face of the ring, four triangular contacting jaws sliding in the ways formed by said flange, ring and face plate, and each jaw having in its inner or working edge a recess receiving the adjacent contacting edge of the adjoining jaw, and a screw swiveled in the ring and in threaded engagement with the outer edge of one of said jaws, to positively move it in both directions, and thereby correspondingly actuate all of the jaws.

RAY C. HELMAN.

Witnesses:
D. L. WHITTIER,
J. C. FERGUSON.